(12) United States Patent
Barnes

(10) Patent No.: US 8,381,428 B2
(45) Date of Patent: Feb. 26, 2013

(54) PORTABLE FISHING POLE HOLDER

(75) Inventor: Richard Barnes, Fairborn, OH (US)

(73) Assignee: Piscatores, LLC, Fairborn, OH (US)

( * ) Notice: Subject to any disclaimer, the term of this patent is extended or adjusted under 35 U.S.C. 154(b) by 0 days.

(21) Appl. No.: 12/896,912

(22) Filed: Oct. 3, 2010

(65) Prior Publication Data
US 2012/0079756 A1 Apr. 5, 2012

Related U.S. Application Data

(63) Continuation of application No. 12/128,645, filed on May 29, 2008, now Pat. No. 7,827,729.

(60) Provisional application No. 60/932,262, filed on May 30, 2007.

(51) Int. Cl.
A01K 97/10 (2006.01)

(52) U.S. Cl. .......................... 43/21.2; 248/530

(58) Field of Classification Search ................ 43/21.2, 43/4.5; 248/530
See application file for complete search history.

(56) References Cited

U.S. PATENT DOCUMENTS

| 2,209,504 | A | | 7/1940 | Beiter | |
|---|---|---|---|---|---|
| 4,611,427 | A | * | 9/1986 | Coutcher | 43/21.2 |
| 4,656,774 | A | * | 4/1987 | Terrill | 43/21.2 |
| 5,187,891 | A | * | 2/1993 | Stanishewski | 43/21.2 |
| 5,488,798 | A | * | 2/1996 | Beachel | 43/21.2 |
| 6,568,122 | B1 | * | 5/2003 | Smith | 43/21.2 |
| 2005/0144829 | A1 | | 7/2005 | Gonzales | |
| 2005/0145664 | A1 | | 7/2005 | Fappiano | |
| 2006/0086883 | A1 | | 4/2006 | Moses | |
| 2006/0213109 | A1 | * | 9/2006 | Zunker | 43/21.2 |
| 2007/0089351 | A1 | | 4/2007 | Higgins | |
| 2007/0107555 | A1 | * | 5/2007 | Zhou | 81/3.37 |
| 2008/0022810 | A1 | * | 1/2008 | Panetti | 81/3.45 |
| 2008/0098854 | A1 | * | 5/2008 | Goldstein | 81/3.29 |
| 2011/0099883 | A1 | * | 5/2011 | Baltes | 43/21.2 |
| 2011/0154714 | A1 | * | 6/2011 | Rieck et al. | 43/21.2 |

FOREIGN PATENT DOCUMENTS

GB 2129261 A * 5/1984

* cited by examiner

Primary Examiner — Christopher P Ellis
(74) Attorney, Agent, or Firm — John Lindsay

(57) ABSTRACT

The portable fishing pole holder comprises a generally "Y" shaped frame which further comprises a support member, an anchor, and a bridge. The support member comprises a bent or curved shaft, having a first end and a second end. The anchor comprises a substantially straight shaft having a first end and a second end, with the anchor being joined to the support member and extending downwardly. The anchor has a helix portion with an inner volume defining a hollow space, with the diameter and pitch of the helix being dimensioned to provide a configured resistance. The bridge substantially spans from the first end of the support member to the second end of the support member, with the first end of the bridge being fastened to the first end of the support member.

8 Claims, 5 Drawing Sheets

PORTABLE FISHING POLE HOLDER

PRIORITY

The present invention claims priority to nonprovisional application 12/128,645, which claims priority to provisional application 60/932,262, which has a filing date of May 30, 2007.

BACKGROUND

1. Field of the Invention

The present invention relates to fishing pole holding devices, more specifically fishing pole holding devices which are portable.

2. Description of the Related Art

An individual might wish to fish at a remote destination a significant distance from a car, boat, or cabin. Once that individual reaches the fishing destination, he might seek to place fishing bait secured to fishing line and fishing pole in the water. After placing the bait in the water, the fisherman would like to be free to perform other activities without manually holding the fishing pole. Additionally, the fisherman would desire the ability to monitor the fishing pole from afar for activity in order to notice any motion on the fishing line or pole, minimize the risk of losing the pole, and minimize the risk of losing a fish that takes the bait. Currently, a fisherman may lean the fishing pole against an object such as a rock or tree, sacrificing preferred fishing spots. Alternatively, the fisherman may place the baited pole on the ground, risking the loss of the pole and sacrificing visual monitoring. For the foregoing reasons, such a person would find it helpful to have a portable fishing pole holder which is portable, easy to anchor, and easy to monitor.

SUMMARY

The fishing pole holder comprises a generally "Y" shaped frame which further comprises a support member, an anchor, and a bridge. The support member comprises a bent or curved shaft, having a first end and a second end. The anchor comprises a substantially straight shaft having a first end and a second end, with the anchor being joined to the support member and extending downwardly. The anchor has a helix portion with an inner volume defining a hollow space, with the diameter and pitch of the helix being dimensioned to provide a configured resistance. The bridge substantially spans from the first end of the support member to the second end of the support member, with the first end of the bridge being fastened to the first end of the support member.

These and other features, aspects, and advantages of the invention will become better understood with reference to the following description, appended claims, and accompanying drawings.

DETAILED DESCRIPTION

Figure 1:
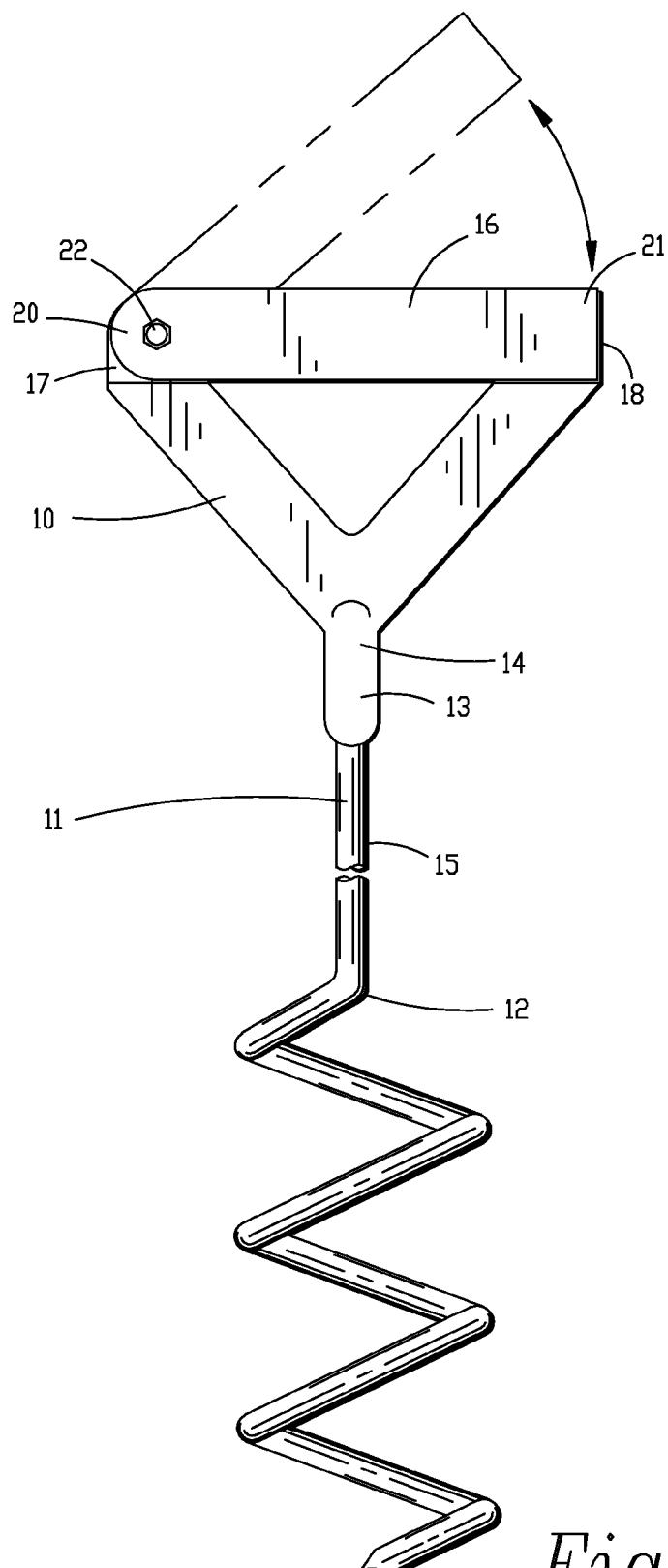
FIG. 1 shows a front side view of an embodiment of the invention.
Figure 2:
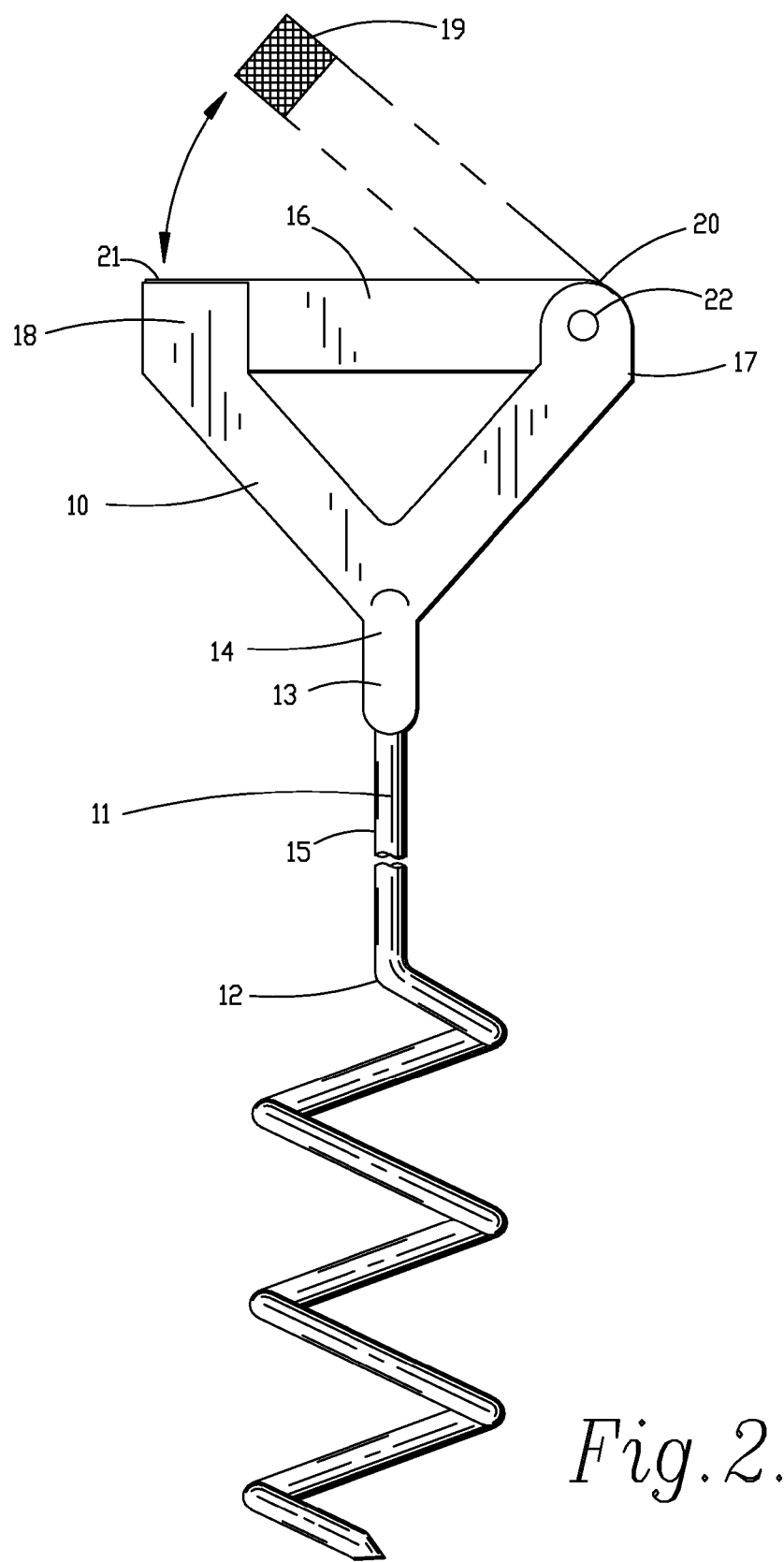
FIG. 2 shows a rear side view of an embodiment of the invention.
Figure 3:
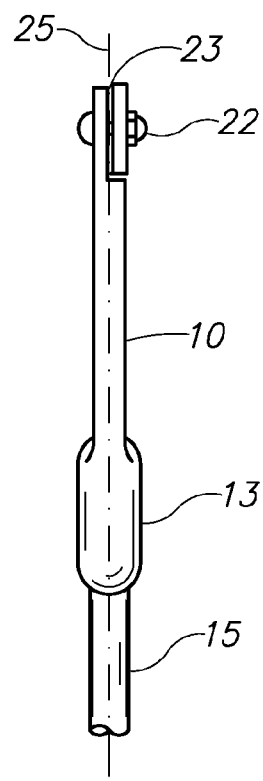
FIG. 3 shows a left side view of an embodiment of the invention.
Figure 4:
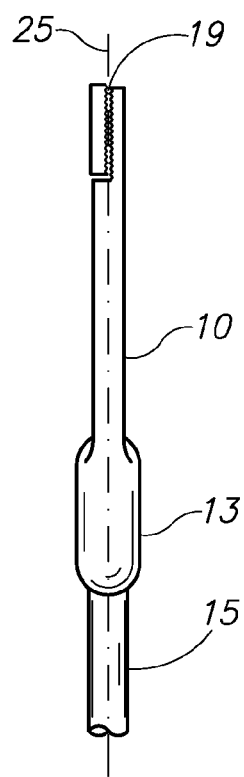
FIG. 4 shows a right side view of an embodiment of the invention.
Figure 5:
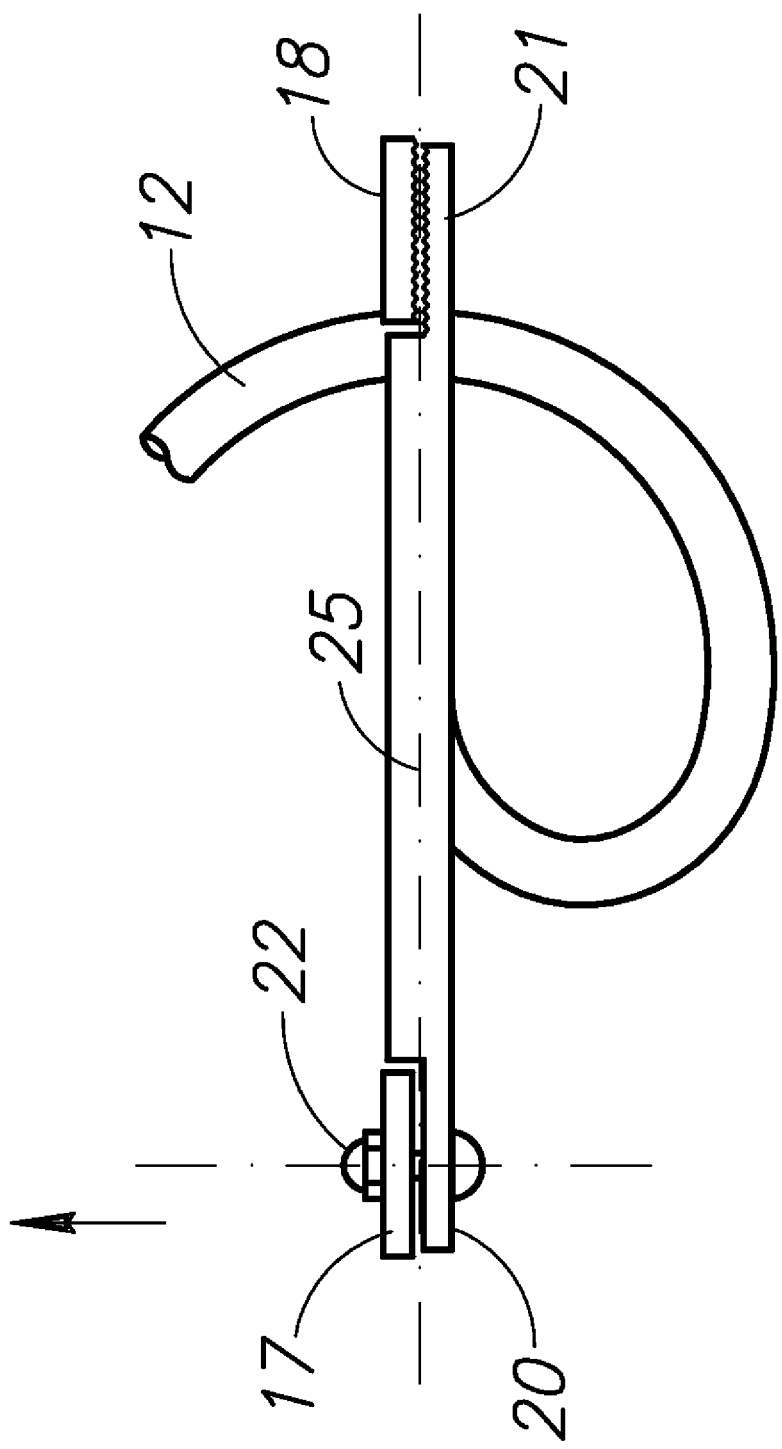
FIG. 5 shows a top view of an embodiment of the invention.
Figure 6:
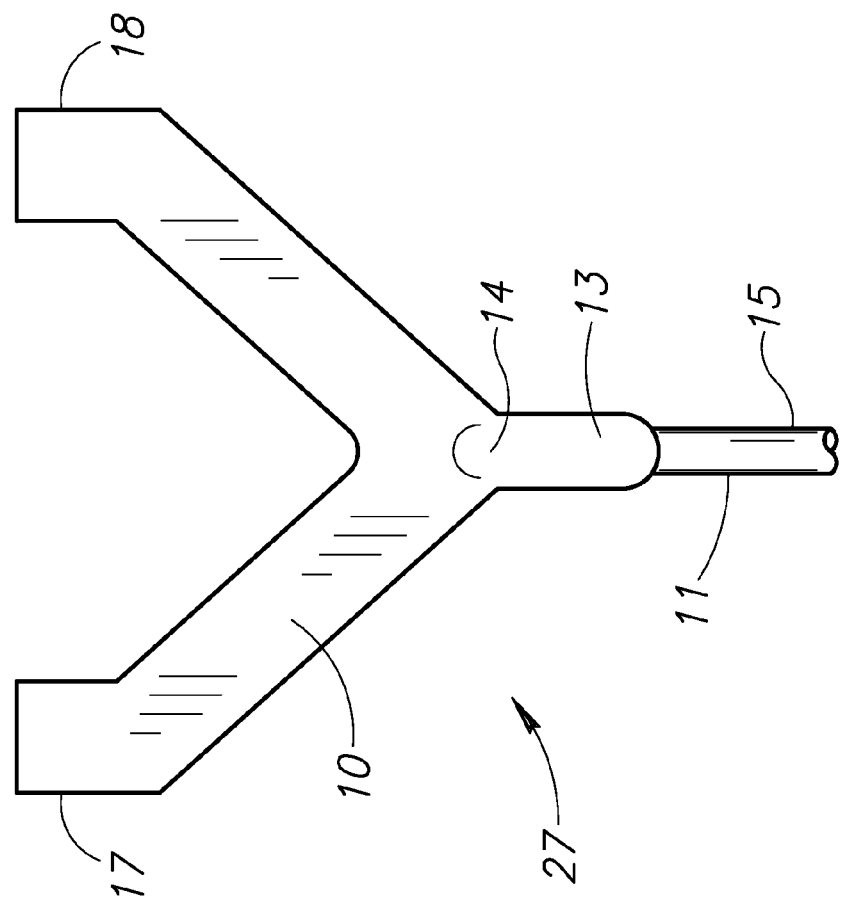
FIG. 6 shows a front side view of a section of an embodiment of the invention.

One embodiment of the fishing pole holder comprises a generally "Y" shaped frame 27 which further comprises two members. The support member 10 is a bent shaft. Optionally, the shaft may be curved. It's unbent length ranges from about 2 to 14 inches. The anchor 11 is a substantially straight shaft ranging from about 6 to 60 inches in length. The first end 13 of the anchor 11 is joined to the shaft 10, preferably at the elbow 14 of the shaft 10. The second end 15 of the anchor 11 extends downwardly from the shaft 10. The shaft 10 and anchor 11 are preferably composed of stainless steel, but may be composed of any rigid material, including wood, ceramics, polymers, or metals.

A second embodiment of the fishing pole holder comprises a generally "Y" shaped frame 27 and a bridge 16. The frame 27 further comprises two members 10 11. The first support member 10 is a bent shaft with slots on both ends. Optionally, the shaft 10 may be curved. It's unbent length ranges from about 2 to 14 inches. The anchor 11 is a substantially straight shaft ranging from about 6 to 60 inches in length. The first end 13 of the anchor 11 is joined to the shaft 10, preferably at the elbow 14 of the shaft 10. The second end 15 of the anchor 11 extends downwardly from the shaft 10. The bridge 16 is a straight shaft with partially recessed ends. Its length varies, being long enough to span the two ends 17 18 of the first member. When this second embodiment is used, the recessed ends of the bridge are placed into the slots of the shaft 10. Those skilled in the art would appreciate structures other than a slot and recess pairing may be employed to secure the bridge 16 to the shaft 10. All members of this embodiment may be composed of any rigid material, including wood, ceramics, polymers, or metals.

A third embodiment of the fishing pole holder comprises a generally "Y" shaped frame 27 which further comprises three members 10 11 12. The first support member 10 is a bent shaft. Optionally, the shaft 10 may be curved. It's unbent length ranges from about 2 to 14 inches. The anchor 11 is a substantially straight shaft ranging from about 6 to 60 inches in length. The first end 13 of the anchor 11 is joined to the shaft 10, preferably at the elbow 14 of the shaft 10. The second end 15 of the anchor 11 extends downwardly from the shaft 10. The anchor 11 includes a generally helical section 12, extending downwardly from the base portion 15 of the anchor 11. The height of the helix should be about 2 to 24 inches and the average diameter of the spiral should be about 1 to 12 inches, with the diameter being optimized to provide a configured resistance for controlled lateral movement and tension to an engaged fish. All members of this embodiment may be composed of any rigid material, including wood, ceramics, polymers, or metals.

A fourth embodiment of the fishing pole holder comprises a generally "Y" shaped frame 27 which further comprises three members 10 11 12.

The first support member 10 is a bent shaft with a gripping surface 19 on one end. Optionally, the shaft may be curved. At least a portion of the gripping surface has small grooves, where the grooves are dimensioned to provide a textured surface generally similar to that of sandpaper or a file. The shaft's 10 unbent length ranges from about 2 to 14 inches. The anchor 11 is a substantially straight shaft ranging from about 6 to 60 inches in length. The first end 13 of the anchor 11 is joined to the shaft 10, preferably at the elbow 14 of the shaft 10. The second end 15 of the anchor 11 extends downwardly from the shaft 10. A bridge 16 is a substantially straight shaft with a second gripping surface 19 on one end. Its length varies, being substantially the distance between the ends 17 18 of the shaft 10.

The second end 17 of the shaft 10 is joined to the second end 20 of the bridge 16. One mechanical fastening system for joining the ends 17 20 is a hinge 22, where the bridge 16 enables forms an enclosure in the frame. The bridge can rotate in a manner substantially coplanar with the shaft 10 and anchor 11. The hinge 22 provides sufficient resistance to handle the erratic motion of a fishing pole when it is placed inside the enclosure created by securing the shaft 10 to the bridge 16. Optionally, the selected hinge 22 can have play 23 so that the hinged end 20 of the third member 16 can move slightly out of plane 25. This play allows additional controlled motion of the fishing pole within the fishing pole holder, enhancing the ability to monitor the fishing pole for activity. Additionally, the play allows configurable resistance to the enclosed fishing pole, enhancing the ability to catch fish who may be sensitive to the resistance on fishing line when engaging the bait. All members of this embodiment may be composed of any rigid material, including wood, ceramics, polymers, or metals. However, the preferred material is stainless steel.

To use the embodiment, the fisherman would first carry the fishing pole holder to a desired location and anchor the device into the ground. Then he would open the unhinged end 21 of the bridge 16. Next, he would place the fishing pole angularly and adjacent to the device, leaning part of the fishing pole into the elbow 14 in the first member 10, preferably with the fishing pole simultaneously contacting both elbow 14 and the bridge 16. Finally, the unhinged end 21 of the bridge 16 is closed, leaving the fishing pole secured in the enclosed region. The fisherman is then free to move about and visually monitor the fishing pole for activity.

While the foregoing detailed description has disclosed several embodiments of the fishing pole holder, it is to be understood that the above description is illustrative only and not limiting of the disclosed invention. For example, one embodiment uses grooves as a gripping surface 19. However, other options for the gripping surface may include surface to surface contact with matching slots, matching corrugated ends, or other means known in the art. Regarding mechanical fastening of the shaft 10 and bridge, other options may include riveting, a prefabricated screw and bolt, or other means in the art. Regarding anchors, other options may include a plurality of legs radially extending from the anchor base 15 configured similarly to a tripod. It will be appreciated that the discussed embodiments and other unmentioned embodiments may be within the scope and spirit of the invention.

Insofar as the description above and the accompanying drawing disclose any additional subject matter that is not within the scope of the single claim below, the inventions are not dedicated to the public and the right to file one or more applications to claim such additional inventions is reserved.

What is claimed is:

1. A portable fishing pole holder comprising:
   a generally "Y" shaped frame which further comprises a support member, an anchor, and a bridge;
   said support member comprising a bent or curved shaft, having a first end and a second end;
   said anchor comprising a substantially straight shaft and having a first end and a second end, said anchor joined to said support member and extending downwardly from said support member;
   said anchor having a helix portion, said helix having an inner volume defining a hollow space, wherein the diameter and pitch of said helix are dimensioned to provide a configured resistance; and
   said bridge substantially spans from said first end of said support member to said second end of said support member, said first end of said bridge being fastened to said first end of said support member.

2. The device of claim 1 wherein said at least a portion of said bridge may slidably move out of the plane defined by said support member and said anchor.

3. The device of claim 1 wherein said bridge and said support are releasably joined proximate said second end of said bridge and said second end of said support.

4. The device of claim 1 wherein said bridge and said support are frictionally joined proximate said second end of said bridge and said second end of said support.

5. The device of claim 1 wherein said bridge has a textured surface proximate said second end of said bridge.

6. The device of claim 1 wherein said bridge has a grooved surface proximate said second end of said bridge.

7. The device of claim 1 wherein said support member has a textured surface proximate said second end of said support member.

8. The device of claim 1 wherein said support member has a grooved surface proximate said second end of said support member.

* * * * *